United States Patent
Arbona et al.

(10) Patent No.: US 11,215,064 B2
(45) Date of Patent: Jan. 4, 2022

(54) COMPACT PIN ATTACHMENT FOR CMC COMPONENTS

(71) Applicant: United Technologies Corporation, Farmington, CT (US)

(72) Inventors: Jaime A. Arbona, West Palm Beach, FL (US); Carson A. Roy Thill, South Berwick, ME (US); Justin K. Bleil, Sanford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 66 days.

(21) Appl. No.: 16/817,990

(22) Filed: Mar. 13, 2020

(65) Prior Publication Data
US 2021/0285334 A1 Sep. 16, 2021

(51) Int. Cl.
*F01D 11/08* (2006.01)
*F16B 19/00* (2006.01)

(52) U.S. Cl.
CPC .............. *F01D 11/08* (2013.01); *F16B 19/00* (2013.01); *F05D 2220/32* (2013.01); *F05D 2240/55* (2013.01)

(58) Field of Classification Search
CPC ...... F01D 11/08; F16B 19/00; F05D 2220/32; F05D 2240/55
See application file for complete search history.

(56) References Cited

U.S. PATENT DOCUMENTS

| | | | |
|---|---|---|---|
| 5,017,092 A * | 5/1991 | Violette | B64C 11/06 416/204 A |
| 5,163,817 A * | 11/1992 | Violette | B64C 11/06 416/204 A |
| 6,884,026 B2 | 4/2005 | Glynn et al. | |
| 6,895,761 B2 | 4/2005 | Mitchell et al. | |
| 7,494,317 B2 | 2/2009 | Keller et al. | |
| 7,832,972 B2 | 11/2010 | Jarmon | |
| 9,587,517 B2 | 3/2017 | Vetters et al. | |
| 10,030,541 B2 | 7/2018 | Vetters et al. | |
| 10,227,880 B2 | 3/2019 | Weaver | |
| 10,301,960 B2 | 5/2019 | Stapleton et al. | |
| 10,590,803 B2 * | 3/2020 | Quennehen | F01D 25/246 |
| 2007/0240423 A1 | 10/2007 | Bulman et al. | |

(Continued)

FOREIGN PATENT DOCUMENTS

| EP | 3196553 | 7/2017 |
| EP | 3450694 | 3/2019 |

OTHER PUBLICATIONS

EP Search Report for EP Application No. 21161855.8 dated Sep. 14, 2021.

*Primary Examiner* — Igor Kershteyn
(74) *Attorney, Agent, or Firm* — Carlson, Gaskey & Olds, P.C.

(57) ABSTRACT

A component assembly includes a first component that has a first hole. The first hole has a non-circular cross section. A first portion of the first hole has a first radius of curvature and a second component. A pin extends from the second component and through the first hole. The pin has a non-circular cross section. A second portion of the pin has a second radius of curvature. The first radius of curvature and the second radius of curvature are substantially the same.

20 Claims, 5 Drawing Sheets

(56) References Cited

U.S. PATENT DOCUMENTS

| | | | |
|---|---|---|---|
| 2010/0104426 A1* | 4/2010 | Keller | F01D 11/12 |
| | | | 415/173.1 |
| 2016/0010482 A1* | 1/2016 | Rogers | F01D 25/246 |
| | | | 415/173.1 |
| 2018/0363506 A1* | 12/2018 | Tesson | F01D 25/246 |
| 2018/0363507 A1* | 12/2018 | Roussille | F01D 11/025 |
| 2018/0371948 A1* | 12/2018 | Lepretre | F01D 25/246 |
| 2019/0284958 A1 | 9/2019 | Schilling et al. | |
| 2019/0338656 A1 | 11/2019 | Weaver | |

* cited by examiner

COMPACT PIN ATTACHMENT FOR CMC COMPONENTS

BACKGROUND

This application relates to an attachment pin for a component, such as a flowpath component.

Gas turbine engines are known and typically include a compressor compressing air and delivering it into a combustor. The air is mixed with fuel in the combustor and ignited. Products of the combustion pass downstream over turbine rotors, driving them to rotate.

Ceramic materials may be used for various components within a gas turbine engine. Ceramic materials have a high thermal resistance and low toughness. Ceramic materials may withstand higher gaspath temperatures than some known materials, such as certain metallic materials.

SUMMARY OF THE INVENTION

In one exemplary embodiment, a component assembly includes a first component that has a first hole. The first hole has a non-circular cross section. A first portion of the first hole has a first radius of curvature and a second component. A pin extends from the second component and through the first hole. The pin has a non-circular cross section. A second portion of the pin has a second radius of curvature. The first radius of curvature and the second radius of curvature are substantially the same.

In a further embodiment of any of the above, the first radius of curvature is within 0.005 inches (0.127 mm) of the second radius of curvature.

In a further embodiment of any of the above, the first component is a ceramic material.

In a further embodiment of any of the above, the second component has a second hole. The pin extends through the first hole and the second hole.

In a further embodiment of any of the above, the pin and the first hole have substantially D-shaped cross-sections.

In a further embodiment of any of the above, the second portion of the pin is configured to contact the first portion of the first hole.

In a further embodiment of any of the above, the pin has a substantially flat portion opposite the first portion.

In a further embodiment of any of the above, the substantially flat portion is spaced from the first hole to provide a clearance between the pin and the first hole.

In a further embodiment of any of the above, the pin has a surface that is configured to contact the first hole at a location outside of the first portion.

In a further embodiment of any of the above, the pin is at least partially hollow.

In a further embodiment of any of the above, the pin has a cross-section that is substantially symmetric about a plane.

In a further embodiment of any of the above, the pin is a metallic material.

In a further embodiment of any of the above, the second component is one of a blade outer air seal, a combustor liner, a transition duct, an exhaust nozzle panel, and an airfoil platform.

In another exemplary embodiment, a section of a gas turbine engine includes a first component formed from a ceramic material and is has a first hole. The first hole has a non-circular cross section. A first portion of the first hole has a first radius of curvature. A second component is statically mounted within the gas turbine engine. A pin extends from the second component and through the first hole. The pin has a non-circular cross section. A second portion of the pin has a second radius of curvature. The first radius of curvature and the second radius of curvature are substantially the same.

In a further embodiment of any of the above, the first radius of curvature is within 0.005 inches (0.127 mm) of the second radius of curvature.

In a further embodiment of any of the above, the pin has a substantially flat portion opposite the second portion. The substantially flat portion is spaced from the first hole to provide a clearance between the pin and the first hole.

In a further embodiment of any of the above, the pin and the first hole have substantially D-shaped cross-sections.

In a further embodiment of any of the above, the second portion of the pin is configured to contact the first portion of the first hole.

In another exemplary embodiment, a blade outer air seal assembly includes a carrier that has a first aperture. A blade outer air seal has at least one segment mounted in the carrier. The at least one segment has a first wall that has a first hole. A pin extends through the first aperture and through the first hole. The pin has a non-circular cross-section.

In a further embodiment of any of the above, the carrier has a second aperture. A second hole extends through the first wall. A second pin extends through the second aperture and the second hole. The second aperture has a different cross section from the first aperture.

DETAILED DESCRIPTION

Figure 1:
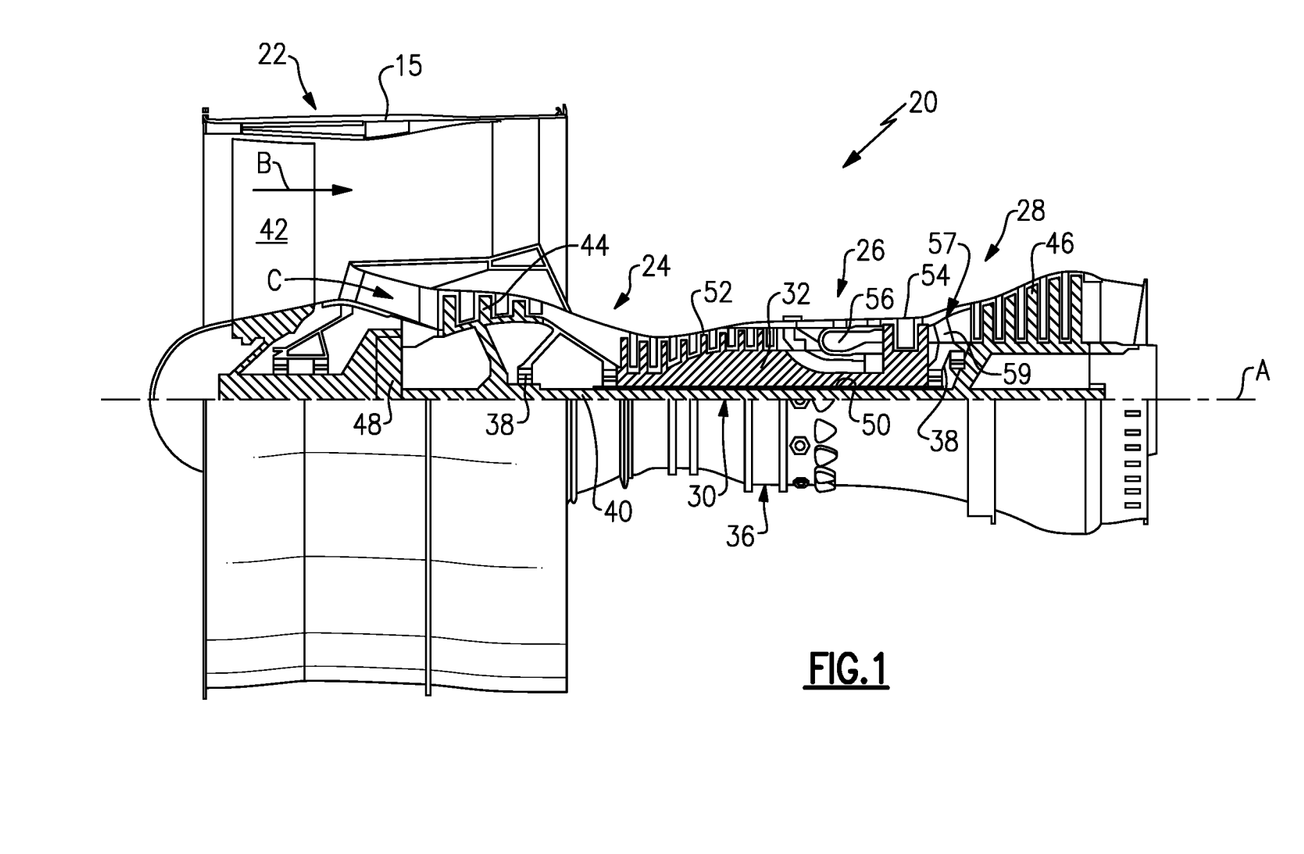
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 2:
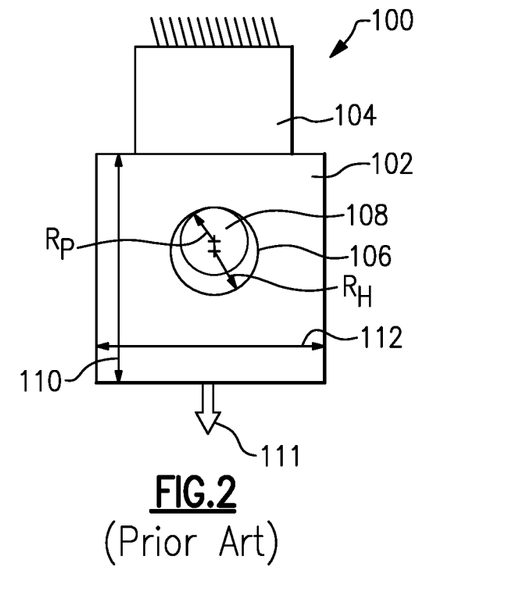
FIG. 2 schematically illustrates an example known component assembly.
Figure 3:
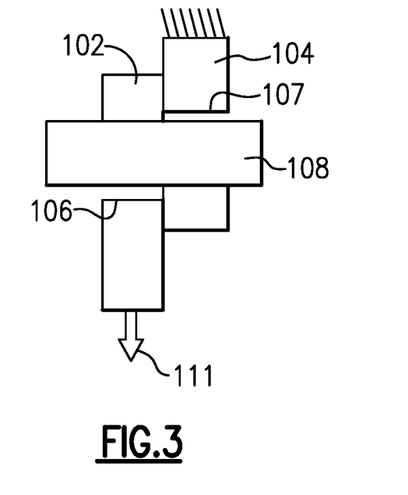
FIG. 3 schematically illustrates a cross-sectional view of the component assembly.

FIGS. 2 and 3 show a portion of an example component assembly 100, which may be incorporated into a gas turbine engine such as the one shown in FIG. 1. The component assembly 100 may include any components in the gas path or that have a pressure change across them, such as a shroud or duct. The component assembly 100 may be part of a blade outer air seal (BOAS), combustor liner panel, transition duct, exhaust nozzle liner, and separate turbine airfoil platforms, or other CMC components, for example.

The component assembly 100 includes a first component 102 that is formed from a ceramic material. In one example, the first component 102 is a ceramic matrix composite ("CMC") material. The first component 102 is formed of a plurality of CMC laminates. The laminates may be silicon carbide fibers, formed into a braided or woven fabric in each layer. In other examples, the first component 102 may be made of a monolithic ceramic. CMC components such as the first component 102 are formed by laying fiber material, such as laminate sheets or braids, in tooling, injecting a gaseous infiltrant into the tooling, and reacting to form a solid composite component. The component may be further densified by adding additional material to coat the laminates. In the illustrated example, the fibers extend in a first direction 110 and a second direction 112 that is perpendicular to the first direction 110. The first direction 110 may be a radial direction, for example.

As shown in the cross-sectional view of FIG. 3, the first component 102 is mounted to a second component 104 via a pin 108. The second component 104 is statically mounted within the engine 20. The second component 104 may be mounted to the engine static structure 36, or another structure within the engine 20, for example. The second component 104 may be any material, including a metallic material, ceramic material, or other material. The pin 108 extends through a hole 106 in the first component 102 and a hole 107 in the second component 104. In this example, the pin 108 contacts the hole 106 of the first component 102 at a side opposite a direction of a load 111 on the first component 102. The load 111 may be radially inward, for example. A pin attachment assembly may transmit load in the direction of some fibers. That is, the loads may be in-plane with the fiber directions 110, 112, which may minimize interlaminar stresses.

As shown in FIG. 2, known pins 108 and holes 106 have a circular cross-section. The pin 108 has a radius $R_P$ and the hole 106 has a radius $R_H$. The hole radius $R_H$ must be larger than the pin radius $R_P$ in order to provide clearance between the pin 108 and the hole 106. Because of the differing radii $R_P$, $R_H$, the pin 108 contacts the hole 106 over a very small area. This arrangement may provide large stresses on the component 102. One way of decreasing these stresses is to increase the pin size to increase the contact area. Such an arrangement with a circular pin increases the amount of radial space required for the pin 108.

Figure 4:
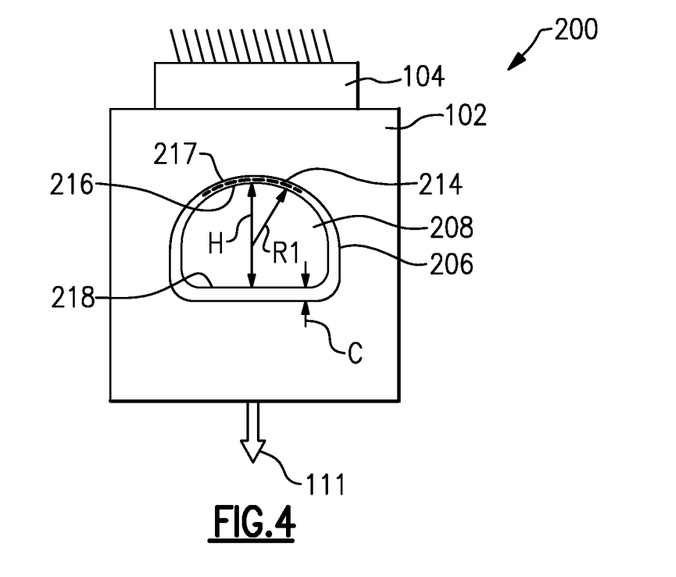
FIG. 4 schematically illustrates an exemplary component assembly according to an embodiment.

FIG. 4 illustrates an example component assembly 200 according to an embodiment. In this example, the pin 208 has a generally D-shaped cross-sectional shape. The hole 206 has a similar D-shape. This unique pin shape provides a larger contact area in a smaller space in the radial direction. A portion 216 of the pin 208 has a radius R1 that is substantially identical to a radius of a portion 217 of the hole 206. In one example, the radius of the portion 216 and the portion 217 are within 0.005 inches (0.127 mm) of one another. The portion 216 of the pin 208 thus contacts the hole 206 over an area 214 that is much larger than for pins having a different radius from the hole.

The pin 208 has a height H. A ratio of the height H to radius R1 is less than 2. Minimizing this ratio helps to minimize the contact stress between the pin 208 and the first component 102. In a further embodiment, the ratio of H to R1 is between 1 and 2. In other embodiments, the ratio H to R1 may be less than 1. The height H is smaller than a height of the hole 206 to provide a clearance C for installation of the pin 208 in the hole 206. The clearance C may also accommodate manufacturing tolerances and thermal expansion. The pin 108 may be formed from any material. In one example, the pin 108 is formed from a metallic material. In other examples, the pin 108 may be formed from a ceramic or other material. The pin 108 may have the disclosed D-shaped cross section along an entire length of the pin 108, or along a portion of the length.

Figure 5:
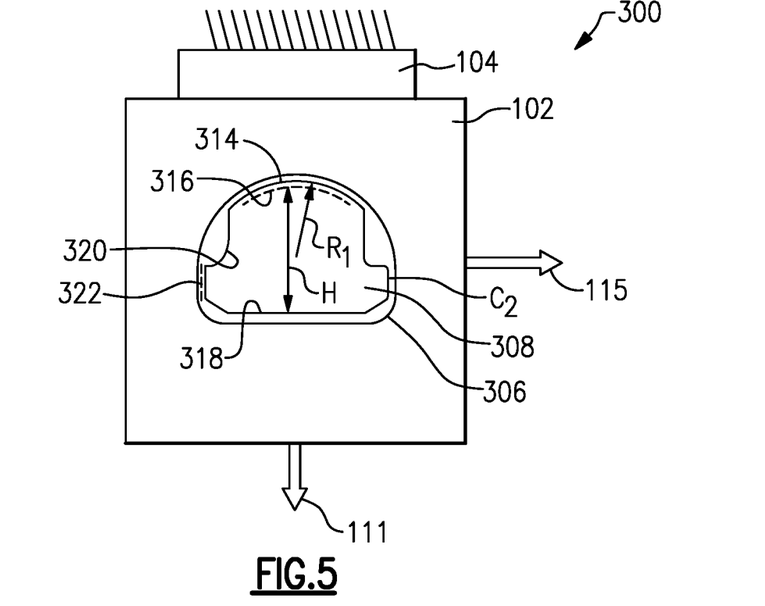
FIG. 5 schematically illustrates an exemplary component assembly according to another embodiment.

FIG. 5 illustrates an example component assembly 300 according to another embodiment. In this example, the pin 308 has a surface 322 to that is configured to contact the hole 306 at a different point from the area 314. The radiused portion 316 contacts the hole 306 to support the load 111, while the surface 322 contacts the hole 306 to support a second load 115 in a different direction from the load 111. For example, the load 111 may be a radial load, while the load 115 is a lateral load. The direction of the loads 111, 115 may be perpendicular to one another. A second clearance $C_2$ is arranged between the pin 308 and the hole 306 opposite the surface 322 to provide clearance for insertion of the pin 308. In some examples, a channel 320 is machined into the pin 308 to form the surface 322.

Figure 6:
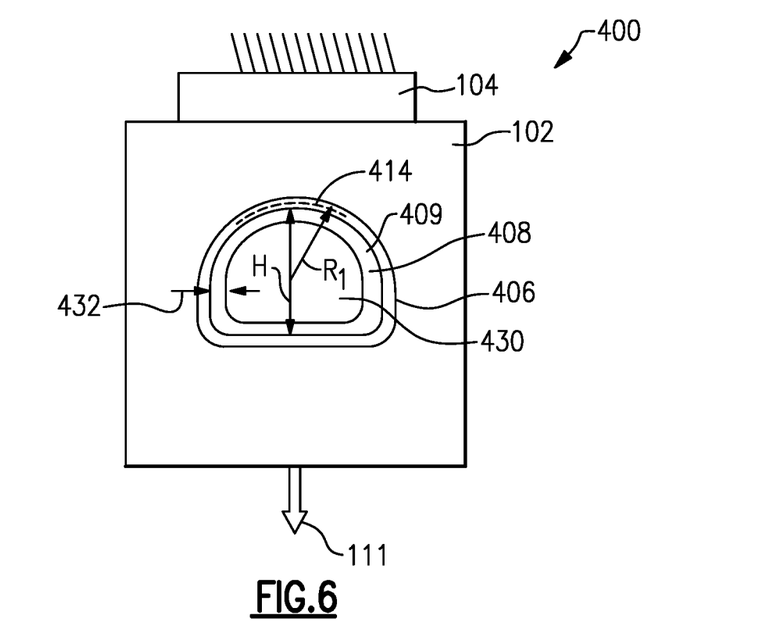
FIG. 6 schematically illustrates an exemplary component assembly according to another embodiment.

FIG. 6 illustrates an example component assembly 400 according to another embodiment. In this example, the pin 408 is at least partially hollow. A wall 409 having a thickness 432 forms the pin 408 and encloses a cavity 430 within the pin 408. The cavity 430 may run the entire length of the pin 408 or for part of the length of the pin 408. This arrangement reduces radial stiffness of the pin 408. The reduced radial stiffness may add compliance to the joint for improved distribution of contact stresses. The pin 408 must be formed from a material that is able to withstand the high temperatures of the ceramic component 102. Thus, the hollow cross section of the pin 408 provides a reduced radial stiffness while still using materials that can withstand the temperature requirements of the assembly 400.

Figure 7:
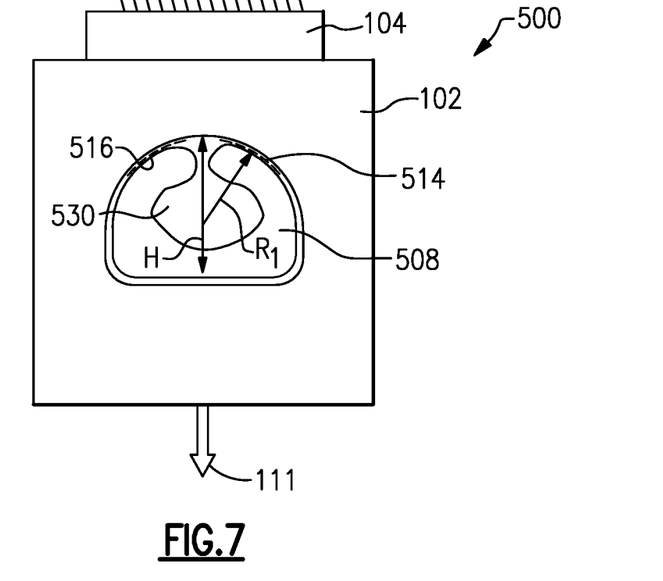
FIG. 7 schematically illustrates an exemplary component assembly according to another embodiment.

FIG. 7 illustrates an example component assembly 500 according to another embodiment. In this example, the pin 508 is at least partially hollow. In this example, an opening in the pin 508 is arranged within the portion 516 that connects with the cavity 530. This arrangement may also provide reduced radial stiffness.

Figure 8:
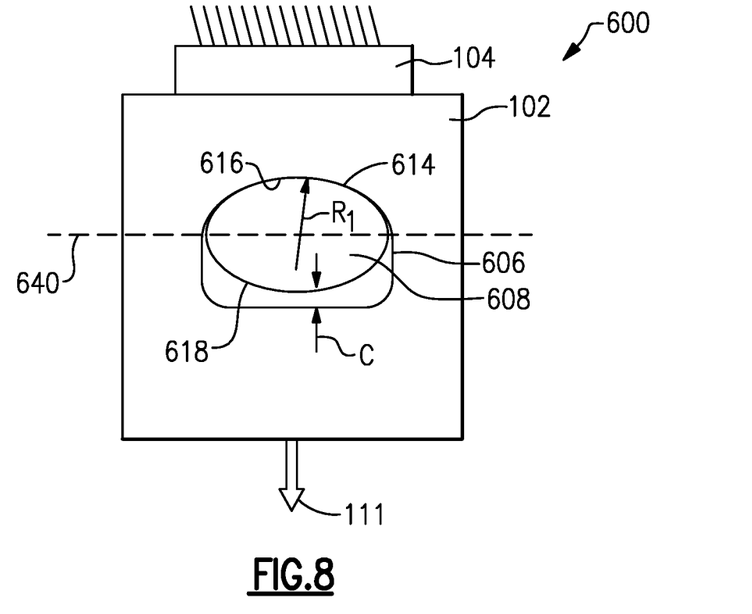
FIG. 8 schematically illustrates an exemplary component assembly according to another embodiment.

FIG. 8 illustrates an example component assembly 600 according to another embodiment. In this example, the pin 608 has a substantially elliptical cross section. The hole 606 may be D-shaped, or may have another shape, such as an elliptical shape. The curved portion 616 of the pin 608 has a radius R1. A second portion 618 of the pin 608 opposite the portion 616 has the same radius R1. Thus, the pin is symmetrical about a plane 640 extending along a length of the pin 608. This symmetrical arrangement may prevent mis-installation of the pin 608 in the hole 606, while still providing an increased R1 and smaller radial height.

Known attachment pins for CMC components may concentrate the load on the edge of the CMC hole, creating a bending moment when there is a difference in curvature between the CMC component and the pin. This can reduce the ultimate strength of the CMC component and lead to part fracture. The disclosed attachment pins 208, 308, 408, 508, 608 help maximize the load area on the CMC component 102, to minimize the stresses in the CMC component 102. This arrangement provides a larger radius for the contact surface while minimizing the pin height, which reduces the space required for the pin attachment. Thus, reduced contact stresses in the component 102 may be achieved within the same radial space as known circular pins. The matched radii of the pin 208 and hole 206 may substantially reduce nominal bearing contact stresses.

The disclosed pins 208, 308, 408, 508, 608 may be used for securing a variety of ceramic components. In particular, the components may be simply supported components that are in the gas path or have a pressure change across them, such as shrouds or ducts. Other example ceramic components in gas turbine engines that could use this pin arrangement may include such as BOAS segments, combustor liner panels, transition ducts, exhaust nozzle liners, blades or vanes, and separate turbine airfoil platforms.

Figure 9:
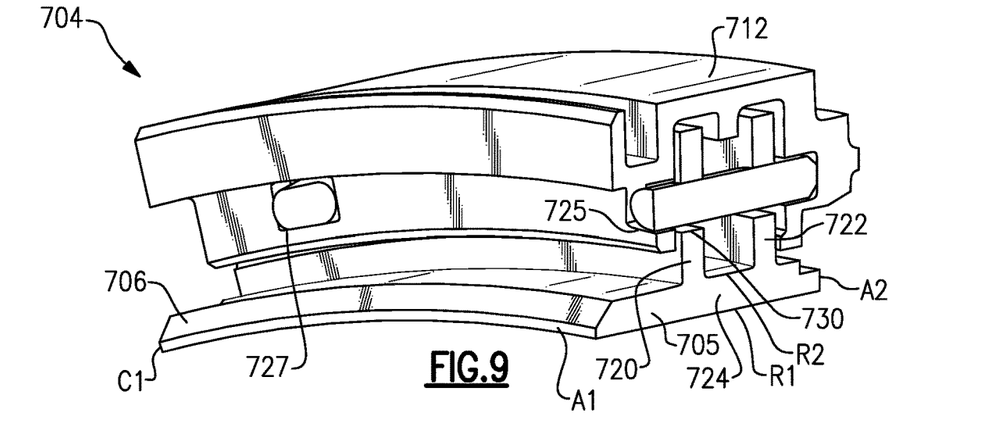
FIG. 9 schematically illustrates an exemplary blade outer air seal assembly according to an embodiment.

FIG. 9 illustrates an example blade outer air seal (BOAS) assembly 704 utilizing a pin attachment according to an embodiment. The BOAS assembly 704 is spaced from a radially outer tip of a turbine blade, and includes a BOAS 706. The BOAS 706 may be made up of a plurality of seal segments 705 that are circumferentially arranged in an annulus about the central axis A of the engine 20. The BOAS segments 705 may be monolithic bodies that are formed of a ceramic material, such as a ceramic matrix composite ("CMC") or monolithic ceramic.

The BOAS 706 may be mounted to an engine case or structure, such as engine static structure 36 via a carrier 712. Each seal segment 705 is a body that defines radially inner and outer sides R1, R2, respectively, first and second axial sides A1, A2, respectively, and first and second circumferential sides C1, C2 (shown in FIG. 10), respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 705 includes a first wall 720 and a second wall 722. The first and second walls 720, 722 extend generally radially outward from a base portion 724. The first and second walls 720, 722 extend along a circumferential width of the seal segment 705 and are axially spaced from one another. The first and second walls 720, 722 may be substantially perpendicular to the base portion 724, in one example. The first and second walls 720, 722 are arranged near the first and second axial sides A1, A2, respectively. The base portion 724 extends between the first and second axial sides A1, A2 and defines a gas path on a radially inner side and a non-gas path on a radially outer side. In this disclosure, forward, aft, upstream, downstream, axial, radial, or circumferential is in relation to the engine axis A unless stated otherwise. The base portion 724 may extend axially forward and/or aft of the first and second walls 720, 722 to provide a surface for sealing of the BOAS first and second axial sides A1, A2.

At least one hole 730 extends through each of the first and second walls 720, 722. In the illustrated example, two holes 730 extend through the first and second walls 720, 722. The carrier 712 includes a first hole 725 and a second hole 727. The carrier holes 725, 727 generally align circumferentially and radially with the holes 730 for securing the BOAS segment 705 to the carrier 712. A pin 708 extends through each of the carrier holes 725, 727 and the BOAS holes 730. The pin 708 extends in a generally axial direction and retains the BOAS segment 705 in the carrier 712.

Figure 10:
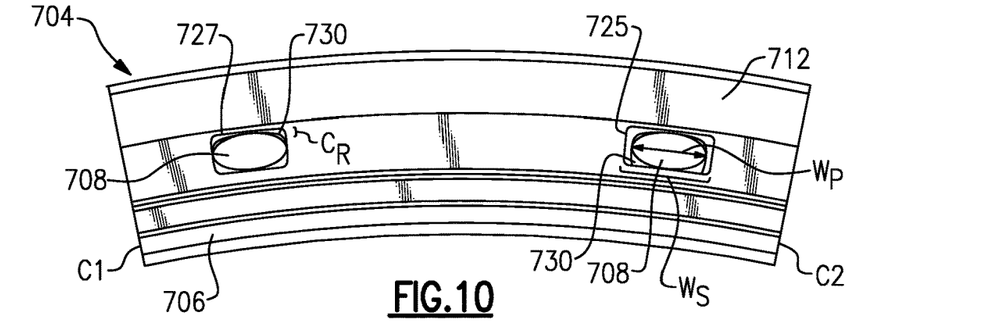
FIG. 10 schematically illustrates a front view of the blade outer air seal assembly of FIG. 9.

As can be seen in FIG. 10, the two holes 730 in the BOAS segment 706 are generally the same size and shape as one another. The holes 730 in the BOAS segment 706 may be generally D-shaped to accommodate the pin 708. The holes 725, 727 in the carrier 712 may be generally rectangular, in one example.

Figure 11:
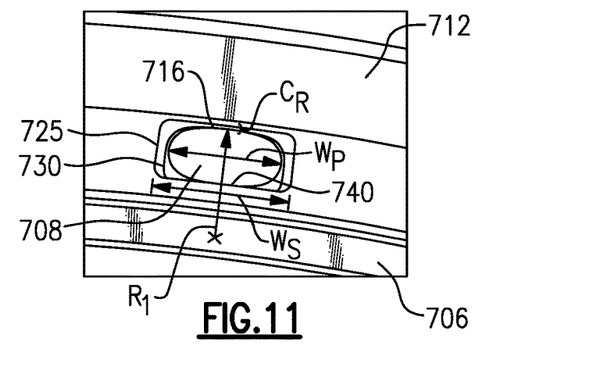
FIG. 11 schematically illustrates a portion of the blade outer air seal assembly of FIG. 9.

As shown in FIG. 11, the holes 730 in the BOAS segment 706 includes a curved portion 716 having a radius R1 that matches a radius of a portion of the pin 708. The pin 708 may have a generally elliptical shape, for example. In other examples, the pin 708 may have any of the cross-sectional shapes described above.

In the illustrated example, the hole 730 has a width that is close to a width $W_P$ of the pin 708. The hole 725 has a width $W_S$ that is wider than the width $W_P$ or the width of the hole 730. This wider width $W_S$ in the circumferential direction provides a large clearance in the circumferential direction. The hole 725 provides more circumferential clearance than the hole 727. This allows the hole 727 to locate the BOAS segment 706 in the circumferential direction, while the hole 725 allows circumferential thermal expansion of the carrier 712 relative to the BOAS segment 706. In the illustrated example, each of the holes 725, 727 has a clearance $C_R$ in the radial direction to provide enough space to accommodate pin rotation from BOAS uncurling during operation.

The disclosed pin attachment for a BOAS provides enough clearance between the top of the pin and the above case to accommodate pin rotation driven by BOAS uncurling during operation. Bearing contact stresses from the pin may be reduced because of the matching radii between the pin 708 and the holes 730 in the BOAS, while utilizing less space in the radial direction compared to cylindrical pins. In some examples, sliding wear occurs at the interface between the pin and case, rather than the pin and BOAS, which may protect the CMC surface. This arrangement may provide tight circumferential control of a CMC BOAS relative to a metallic case, while allowing free thermal expansion within the components.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A component assembly, comprising:
    a first component having a first hole, the first hole having a non-circular cross section, a first portion of the first hole having a first radius of curvature;
    a second component; and
    a pin extending from the second component and through the first hole, the pin having a non-circular cross section, and a second portion of the pin having a second radius of curvature, the first radius of curvature and the second radius of curvature are substantially the same.

2. The component assembly of claim 1, wherein the first radius of curvature is within 0.005 inches (0.127 mm) of the second radius of curvature.

3. The component assembly of claim 1, wherein the first component is a ceramic material.

4. The component assembly of claim 1, wherein the second component has a second hole and the pin extends through the first hole and the second hole.

5. The component assembly of claim 1, wherein the pin and the first hole have substantially D-shaped cross-sections.

6. The component assembly of claim 1, wherein the second portion of the pin is configured to contact the first portion of the first hole.

7. The component assembly of claim 1, wherein the pin has a substantially flat portion opposite the first portion.

8. The component assembly of claim 7, wherein the substantially flat portion is spaced from the first hole to provide a clearance between the pin and the first hole.

9. The component assembly of claim 1, wherein the pin has a surface that is configured to contact the first hole at a location outside of the first portion.

10. The component assembly of claim 1, wherein the pin is at least partially hollow.

11. The component assembly of claim 1, wherein the pin has a cross-section that is substantially symmetric about a plane.

12. The component assembly of claim 1, wherein the pin is a metallic material.

13. The component assembly of claim 1, wherein the second component is one of a blade outer air seal, a combustor liner, a transition duct, an exhaust nozzle panel, and an airfoil platform.

14. A section of a gas turbine engine, comprising:
    a first component formed from a ceramic material and having a first hole, the first hole having a non-circular cross section, a first portion of the first hole having a first radius of curvature;
    a second component statically mounted within the gas turbine engine; and
    a pin extending from the second component and through the first hole, the pin having a non-circular cross section, and a second portion of the pin having a second radius of curvature, the first radius of curvature and the second radius of curvature are substantially the same.

15. The section of a gas turbine engine of claim 14, wherein the first radius of curvature is within 0.005 inches (0.127 mm) of the second radius of curvature.

16. The section of a gas turbine engine of claim 14, wherein the pin has a substantially flat portion opposite the second portion, and the substantially flat portion is spaced from the first hole to provide a clearance between the pin and the first hole.

17. The section of a gas turbine engine of claim 14, wherein the pin and the first hole have substantially D-shaped cross-sections.

18. The section of a gas turbine engine of claim 14, wherein the second portion of the pin is configured to contact the first portion of the first hole.

19. A blade outer air seal assembly, comprising:
- a carrier having a first aperture and a second aperture;
- a blade outer air seal having at least one segment mounted in the carrier, the at least one segment having a first wall having a first hole and a second hole; and
- a pin extending through the first aperture and through the first hole, the pin having a non-circular cross-section; and
- a second pin extends through the second aperture and the second hole, wherein the second aperture has a different cross section from the first aperture.

20. The blade outer air seal assembly of claim 19, wherein the pin and the first hole have substantially D-shaped cross-sections.

* * * * *